US008696456B2

(12) United States Patent
Bright et al.

(10) Patent No.: US 8,696,456 B2
(45) Date of Patent: Apr. 15, 2014

(54) MUSIC-BASED VIDEO GAME WITH USER PHYSICAL PERFORMANCE

(75) Inventors: Brian Bright, Woodland Hills, CA (US); Michael J. Chrzanowski, Jr., East Greenbush, NY (US); Jonathan L. Hilliker, East Greenbush, NY (US)

(73) Assignee: Activision Publishing, Inc., Santa Monica, CA (US)

( * ) Notice: Subject to any disclaimer, the term of this patent is extended or adjusted under 35 U.S.C. 154(b) by 642 days.

(21) Appl. No.: 12/511,931

(22) Filed: Jul. 29, 2009

(65) Prior Publication Data

US 2011/0028214 A1 Feb. 3, 2011

(51) Int. Cl.
*A63F 13/02* (2006.01)
*A63F 13/10* (2006.01)

(52) U.S. Cl.
CPC ............... *A63F 13/02* (2013.01); *A63F 13/10* (2013.01); *A63F 2300/8047* (2013.01)
USPC .............................................. 463/35; 463/36

(58) Field of Classification Search
CPC .................. A63F 2300/80; A63F 2300/8047; A63F 2300/64; A63F 2300/66; A63F 2300/6607; A63F 2300/6027; A63F 2300/6045; A63F 2300/6063; A63F 2300/6081; A63F 2300/61; A63F 2300/634; A63F 2300/638; A63F 2300/30; A63F 2300/302; A63F 2300/10; A63F 2300/1006; A63F 2300/1018; A63F 2300/1037; A63F 2300/1043; A63F 2300/105; A63F 2300/1062; A63F 2011/0076; A63F 2011/0065; A63F 2011/0072; A63F 2009/2402; A63F 2009/2404; A63F 2009/2408; A63F 2009/243; A63F 2009/2447; A63F 2009/245; A63F 2009/2457; A63F 2009/246; A63F 2009/247; A63F 2009/2477; G09B 15/00; G09B 15/001; G09B 15/002; G09B 15/003; G09B 15/02; G09B 15/023; G09B 15/04; G10H 1/0008; G10H 1/0016; G10H 1/0025; A63B 24/0003; A63B 24/0006
USPC .................................................. 463/35, 36–38
See application file for complete search history.

(56) References Cited

U.S. PATENT DOCUMENTS

| 5,615,132 | A | * | 3/1997 | Horton et al. ..................... 703/7 |
| 5,913,727 | A | * | 6/1999 | Ahdoot ........................... 463/39 |
| 7,128,649 | B2 | * | 10/2006 | Nobe et al. ...................... 463/23 |
| 7,320,643 | B1 | * | 1/2008 | Brosius et al. .................. 463/37 |
| 2007/0131100 | A1 | * | 6/2007 | Daniel ............................ 84/737 |
| 2008/0242415 | A1 | * | 10/2008 | Ahmed ........................... 463/39 |
| 2009/0256801 | A1 | * | 10/2009 | Helmer ......................... 345/156 |
| 2009/0258704 | A1 | * | 10/2009 | Asami ............................ 463/36 |
| 2010/0113153 | A1 | * | 5/2010 | Yen et al. ........................ 463/37 |

FOREIGN PATENT DOCUMENTS

WO WO 2007/041806 A1 * 4/2007 ............... G01B 5/04

* cited by examiner

*Primary Examiner* — David L Lewis
*Assistant Examiner* — Matthew D. Hoel
(74) *Attorney, Agent, or Firm* — Klein, O'Neill & Singh, LLP (57) ABSTRACT

A music-based video game additionally evaluates a game player's physical performance. The game player's physical performance is evaluated in some embodiments by determining if an indication of controller movement matches predefined patterns while the game player responds to instructive cues to operate a representation of a musical instrument. A representation of a musician may be provided, with the game player to mimic movements of the representation of the musician. The game player may be provided additional points for properly responding to instructive cues while moving in predefined manners.

8 Claims, 11 Drawing Sheets

MUSIC-BASED VIDEO GAME WITH USER PHYSICAL PERFORMANCE

BACKGROUND OF THE INVENTION

The present invention relates generally to video games, and more particularly to music-based video games with user physical performance aspects.

Generally video games are played by game players operating controllers, with the game players operating the controllers by depressing buttons or manipulating other inputs of the controllers in particular fashions responsive to particular display presentations. The display presentations may relate generally to activities that occur in the real world, at least for some, or be entirely fanciful. In either case video games allow game players to experience simulated activities, at least to an extent, that the game players may otherwise be unable or incapable of otherwise taking part in.

In many instances the controllers are generic controllers, including input devices adapted for use with a wide variety of video games. The use of generic controllers is convenient, allowing a game player to use a single controller with a wide variety of video games. The use of generic controllers may, however, detract from the experience of a simulated activity, considering that a generic controller may not in fact be utilized in the activities being simulated.

Music-based video games are popular with some game players. Music-based video games often present instructive cues for manipulation of buttons and the like on a controller, with the video game providing music and increasing a game player score if the game player complies with the instructive cues. In addition, a simulated crowd response may be provided, with the response of the crowd varying depending on extent of compliance by the game player with the instructive cues. Further, in many cases, the controller is generally configured to be similar to a musical instrument, increasing realism of the simulated activity of playing or creating a song.

Such music-based video games, however, may not sufficiently present to a game player the full experience of playing a song, particularly before an audience.

BRIEF SUMMARY OF THE INVENTION

The invention provides a music-based video game with a user physical performance component.

In one aspect the invention provides A method of evaluating game player movement in a music-based video game, comprising: commanding presentation of instructive cues for operation of a controller; determining compliance with the instructive cues by a first game player operating the controller; recording information indicative of movement of the first game player; determining if information indicative of movement of a second game player matches the information indicative of movement of the first game player; and commanding presentation of feedback to at least the second game player based on extent of matching of the indication of movement of the second game player movement and the information indicative of the first game player movement.

In another aspect the invention provides a system for use in providing or music-based video game play, the system comprising: a processor configured by program instructions to: command presentation of instructive cues for operation of input devices of a controller; determine extent of compliance by a game player with the instructive cues based on signals from the controller; command presentation of feedback to the game player as to extent of compliance with the instructive cues; command storage of information indicative of movement of the game player; compare information indicative of movement of another game player with the information indicative of movement of the game players; and command presentation of feedback to the other game player with the information indicative of movement of the game player.

In another aspect the invention provides a method of evaluating game player movement in a music-based video game, comprising: commanding presentation of instructive cues for operation of a controller; determining compliance by a game player operating the controller with the instructive cues; commanding presentation of audio associated with a musical piece based on compliance with the instructive cues; determining if an indication of game player movement matches a predefined movement pattern repeating in time with a beat of the musical piece; and commanding presentation of feedback to the game player as to the extent of compliance with the instructive cues and extent of matching of game player movement with the predefined movement pattern repeating in time with the beat of the musical piece.

In another aspect the invention provides a method performed by a processor configured by program instructions, the method comprising: commanding presentations for game play of a music-based video game, the presentations including instructive cues for operation by a game player of at least some input devices of a controller and feedback to a game player as to compliance with the instructive cues; determining if information indicative of position of the controller indicates that the controller is behind a head of the game player; and increasing a measure of feedback to the game player if the information indicative of position of the controller indicates that the controller is behind the head of the game player.

These and other aspects of the invention are more fully comprehended upon review of this disclosure.

DETAILED DESCRIPTION

Figure 1:
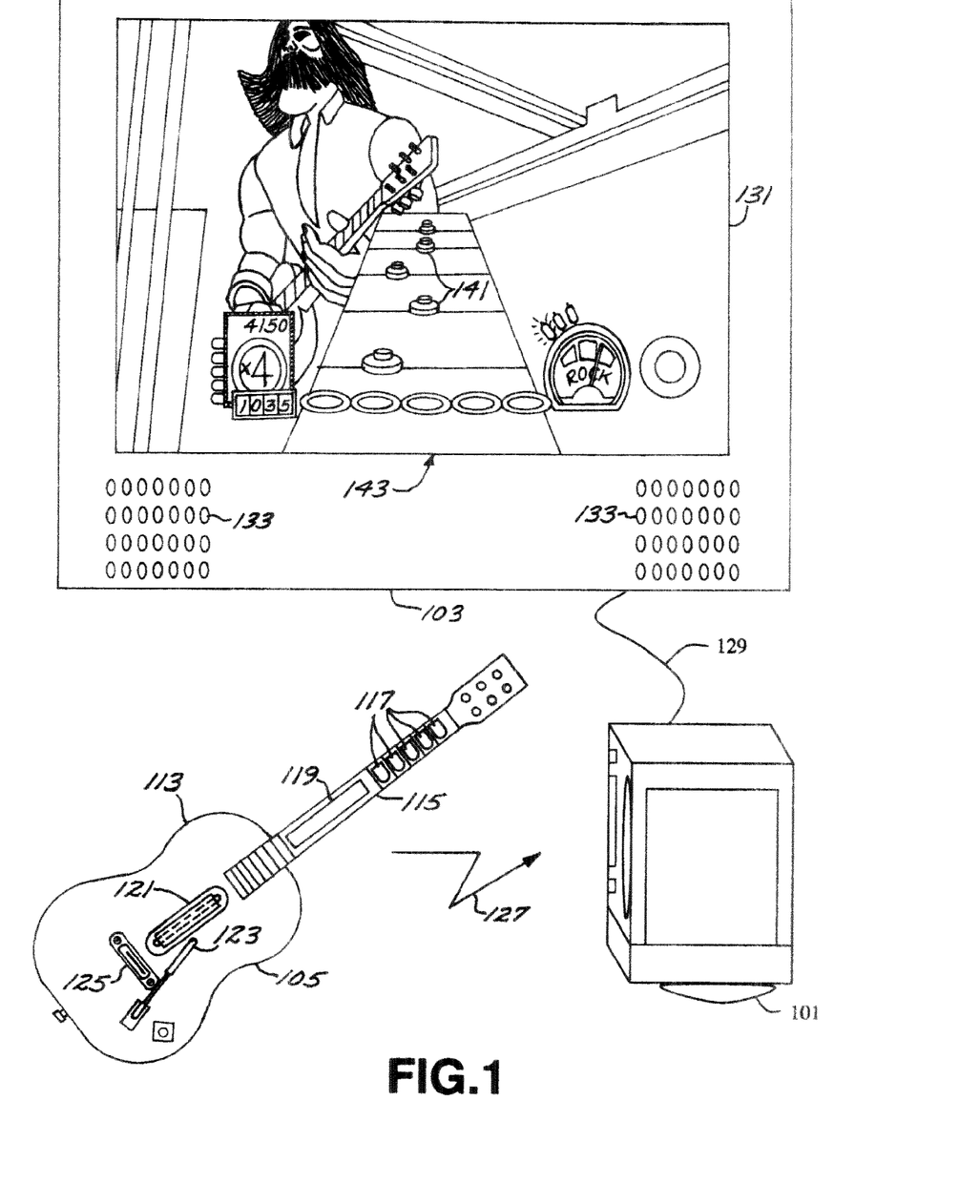
FIG. 1 illustrates an example of a video game system in accordance with aspects of the invention.

FIG. 1 is an example of a video game system in accordance with aspects of the invention. The video game system includes a video game console 101, a display 103, and a controller 105. The video game console includes internal circuitry, which allows the console to run a video game by executing various program instructions related to proper execution of the video game. The video game console typically includes one or more processors, memory, and various interface circuitry. The program instructions for the video game are generally found on a removable memory source such as a video game CD-ROM, inserted into a removable memory interface 111 of the video game console. In some embodiments of the invention, a handheld or portable device capable of playing video games, such as a mobile PC, laptop, mobile gaming device, or mobile phone may be utilized in place of the console. In many embodiments the handheld or portable device includes similar or the same internal circuitry as herein described, as well as, for example, one or more displays, which may be a built in display or projector displays, and various different game player input devices. In some embodiments the video game console may be a computer, for example a personal computer.

The video game console is coupled to the controller by a wireless connection 127, although it should be recognized that in many embodiments the controller and video game console may be coupled by a wired connection. In addition, the controller illustrated in FIG. 1 is in the shape of a guitar, in various embodiments other controllers may instead or additionally be used, for example generic controllers, microphones, drums, drumsticks, keyboards, DJ turntables, other guitar shaped controllers, or controllers in the general form of other musical instruments.

The video game console is also in communication with a display unit 103, generally through an audio-video cable or similar wired connection, although a wireless connection may be used in some embodiments. The display unit is typically a television, although in some embodiments a monitor may be used, with a display screen 131 and at least one audio output device, such as a speaker 133. In the embodiment of FIG. 1, the display screen shows a screen shot of video game play in a music-based video game.

As illustrated in FIG. 1, the display shows a screenshot of an example music-based video game including a game player physical performance aspect. In the particular screenshot of FIG. 1, the display includes a plurality of instructive cues 141. The instructive cues generally scroll across portions of the screen towards and into a predefined area of the screen, such as the NOW area 143. The display also shows a video game character as an in-game musician playing a guitar.

During video game play, a game player is to depress or have depressed various buttons and/or utilize a strum bar or other user manipulable input device of the controller responsive to the instructive cues, generally when the instructive cues reach a predefined area of the display such as the NOW area 143. In most embodiments the video game console evaluates the game player based on extent of compliance with operations commanded by the instructive cues, for example by providing a score, a simulated crowd response, and/or some other feedback to the game player. In addition, the video game console generally commands presentation of audio during video game play. In most embodiments audio of a musical selection is provided as the game player complies with the instructive cues, and silence or a sound of a missed note, possibly depending on whether the game player operates incorrect input devices or does not operate any input device, may be provided if the game player does not comply with the instructive cues.

The video game console also evaluates the game player for movement of the controller and/or the game player, providing a physical performance aspect to video game play. Generally, the video game console evaluates the game player for movement of the controller and/or game player by determining if the controller or game player has moved through a sequence of positions. The sequence of positions includes at least one intermediate position between an initial position and a final position. In some embodiments the game player is provided an increase in score if the game player moves him or herself or the controller in a predefined manner, for example with a predefined movement or sequence of movements, or a score the game player may obtain for complying with instructive cues may be increased or multiplied during or as a result of such movement or movements.

Movements of the controller may include rotating or translating position of the controller. A predefined movement or sequence of movements may include for example, raising the controller at least a predefined distance or moving the controller laterally at least a predefined distance or moving the controller through a predefined sequence of positions or through any of a plurality of predefined sequence of positions, for example spinning the controller or sequentially raising and lowering the controller. Movements of the game player may include jumping by the game player, spinning by the game player, or lateral movement of the game player. In some embodiments movement of the controller may be used as a proxy for movement of the game player, with for example movement of the controller indicating corresponding movement of the game player.

In some embodiments the controller includes one or more position or acceleration sensing devices, for example an accelerometer, geomagnetic sensor, or other sensor, which generates signals provided to the video game console and from which the video game console can determine motion or position of the controller. In some such embodiments the controller may include optical or infrared output devices, such as an LED, or the optical or infrared output devices may be worn by a game player, and the video game console, or hardware data coupled to the video game console, may include optical or infrared sensing devices, or vice versa, with the sensing devices generating signals to the video game console for determination of movement of the controller. Alternatively, a thermal imaging or other imaging device may be coupled to the video game console, generating signals indicative of motion of the controller or the game player. In some such embodiments, images of the controller or the game player may be enhanced by providing the controller or the game player with thermal sources or light sources or reflective items.

Figure 2:
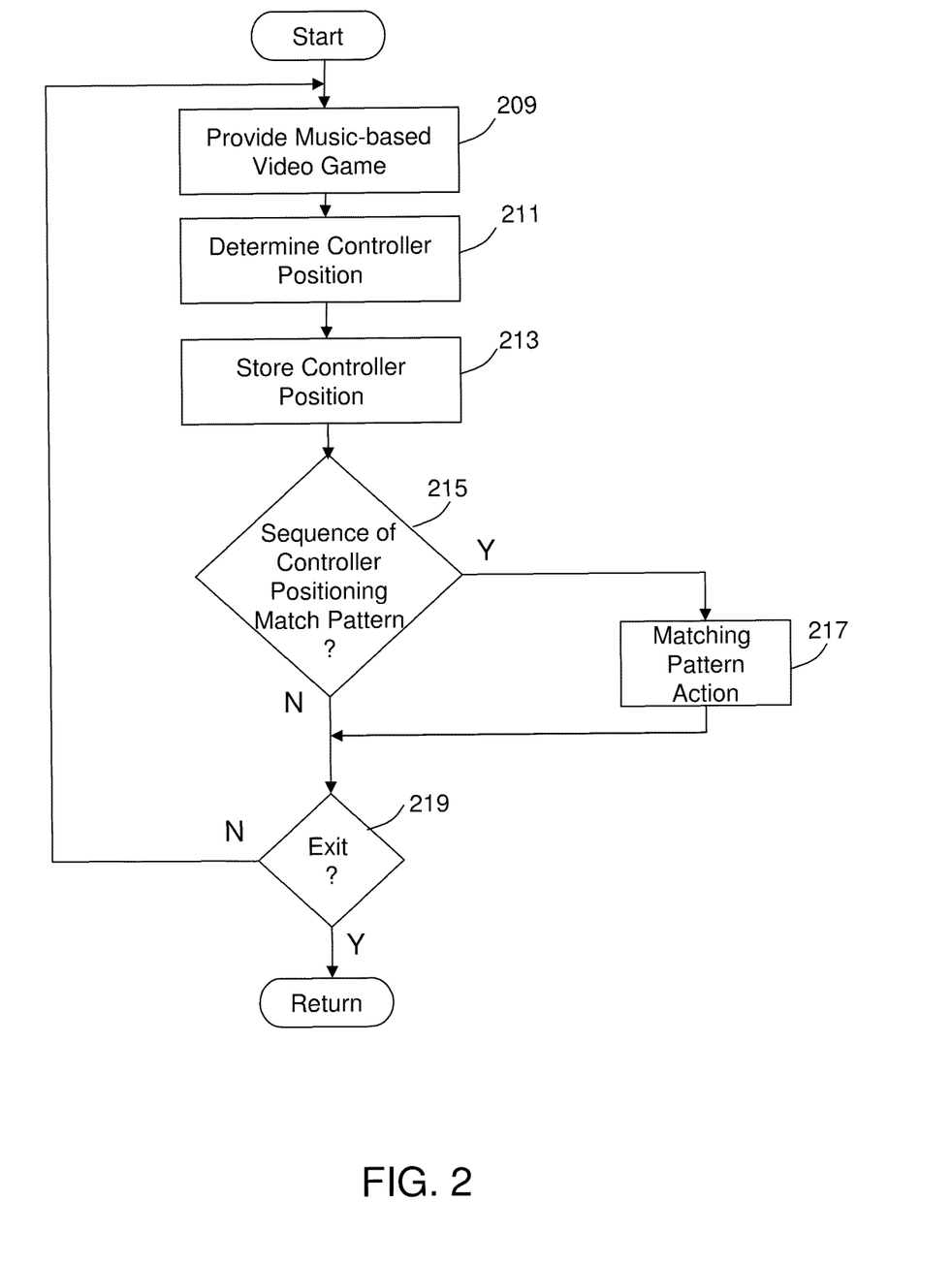
FIG. 2 is a flow diagram of a process of providing a music-based video game with a game player physical performance component in accordance with aspects of the invention.

FIG. 2 is a flow chart of video game operations in accordance with aspects of the invention. The process may be performed by the video game console of FIG. 1, or a processor of the video game console, for example as discussed below with respect to FIG. 3.

In block 209 the process provides for music-based video game play. In many embodiments the process commands display of instructive cues and evaluates game player compliance with the instructive cues, for example based on input signals provided by a controller operated by the game player. In many embodiments the process also commands presentation of audio of a song or portions of a song, with the extent of presentation of the song dependent on the extent of compliance by the game player with the instructive cues. The process may also provide features of music-based video game play commonly found in music-based video games. In most embodiments the process provides for music-based video game play throughout or substantially throughout operation of the process.

Blocks 211-217 relate to motion-related processing during music-based video game play. The motion-related processing is for motion of a game player or a controller carried by the game player. The motion may be responsive to a prompt provided during music-based video game play, for example a motion of or expression by a game character, or other visual, auditory, or other prompt. Alternatively, the motion may be independent of a prompt provided during game play.

In block 211 the process determines a controller position. The controller position may be utilized as a proxy for game player position or posture in some embodiments, and in some embodiments the process may instead determine game player position or posture. For purposes of simplicity of exposition, however, reference shall be primarily to controller position. In some embodiments the process determines controller position based on input signals generated by a position or acceleration dependent sensor in or on the controller. In block 213 the process stores an indication of controller position. In some embodiments the indication of controller position is stored relative to an initial controller position, or merely a prior controller position.

In block 215 the process determines if a sequence of stored controller positions matches a predefined pattern of positions. The predefined pattern may be indicative of a movement or movements of the controller. The movement or movements of the controller may be translations of the controller in some embodiments, rotations in some embodiments, or either translations or rotations, or a combination of each, in some embodiments. In some embodiments the predefined pattern may be only a single predefined pattern, but in many embodiments the predefined pattern may be any of a plurality of predefined patterns. In some embodiments the number of stored controller positions may vary from pattern to pattern.

If in block 215 the process determines that a sequence of stored positions matches a predefined pattern the process proceeds to block 217, otherwise the process proceeds to block 219. In block 217 the process performs an action defined for or based on the matching pattern. Alternatively, the process may perform an action defined for a status of music-based video game play at the time the sequence of stored positions matches a predefined pattern. In many embodiments the action is to increase a point score for the game player, or a multiplier to apply to an increase in points determined as part of music-based video game play. The process thereafter proceeds to block 219 and determines whether the process should exit, although it should be recognized that exit processing may occur through other methods, such as provision of an interrupt signal or otherwise. If the process is not to exit, the process goes to block 209, otherwise the process returns.

Alternatively, in some embodiments in blocks 211 the process may determine controller positions for a plurality of controllers, and in block 213 the process may store an indication of controller position for the plurality of controllers. Processing of blocks 215 and 217, therefore, may be performed for sequences of stored positions for each of a plurality of controllers, and, in some embodiments, different predefined patterns are utilized for sequences of stored controller position for different controllers. In some embodiments, however, in block 215, the process may instead determine whether the stored positions for each of the controllers indicate synchronized movement of the controllers, for example representative of common or synchronized movements of game players carrying the controllers.

Figure 3:
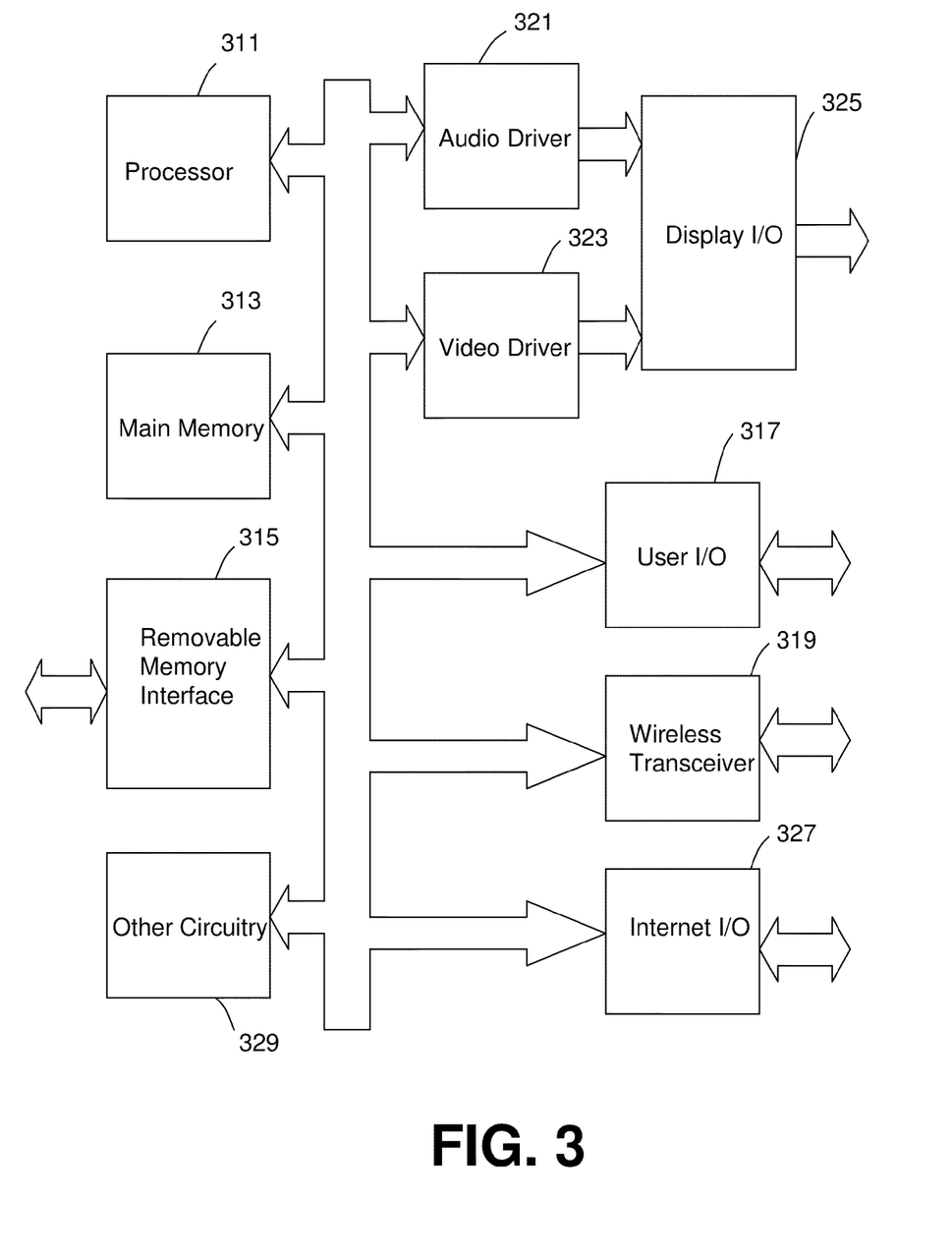
FIG. 3 is a block diagram of a video game console in accordance with aspects of the invention.

FIG. 3 is an example of a block diagram of a video game console in accordance with aspects of the invention. In the embodiment of FIG. 3, the video game console includes at least one processor 301 interconnected with other components via a system bus 303. The other components may include, for example, a main memory 305 of the video game console, a removable memory interface 307, a user input/output port 309, a wireless transceiver 311, an audio driver 313, a video driver 315, an Internet input/output port 317, and other circuitry 319, which may include for example an infrared sensor. In other embodiments of the invention, there may be different combinations of components that make up a video game console, depending on the individual needs of each application.

The processor executes program instructions to provide music-based video game play, for example the music based video game described with respect to FIG. 1, as well as program instructions to provide for a user physical performance aspect to game play, for example as described with respect to FIG. 1 or 2. The processor may obtain program instructions from a removable memory source, for example, a video game CD-ROM, inserted into the removable memory interface of the video game console. The processor also receives game player input signals from a connected video game controller or microphone, either through the user input/output port or the wireless transceiver. The processor processes the program instructions and received input signals to generate audio and video output signals representative of video game play.

The processor may also be in data communication with a display unit, generally combined with one or more speakers, which presents video game action to a game player of the system. The processor may send audio generation information to the audio driver, and video generation information to the video driver, each of which generates audio and video output signals, respectively, from the received generation information. The audio and video drivers forward the audio and video output signals through a combined display input/output port 321, or alternatively, separate audio and video input/output ports, to the display unit.

In some embodiments, the processor is also connected to the Internet via either the Internet input/output port, or via the wireless transceiver. A connection to the Internet may be used to facilitate multiplayer game play with other game players in remote locations in a multiplayer option. In some embodiments, an Internet connection may also be used by video game publishers to offer, for free or for sale, downloadable content associated with a particular game. In a music-based video game, downloadable content may include, for example, new songs, background audio tracks or other content.

Figure 4:
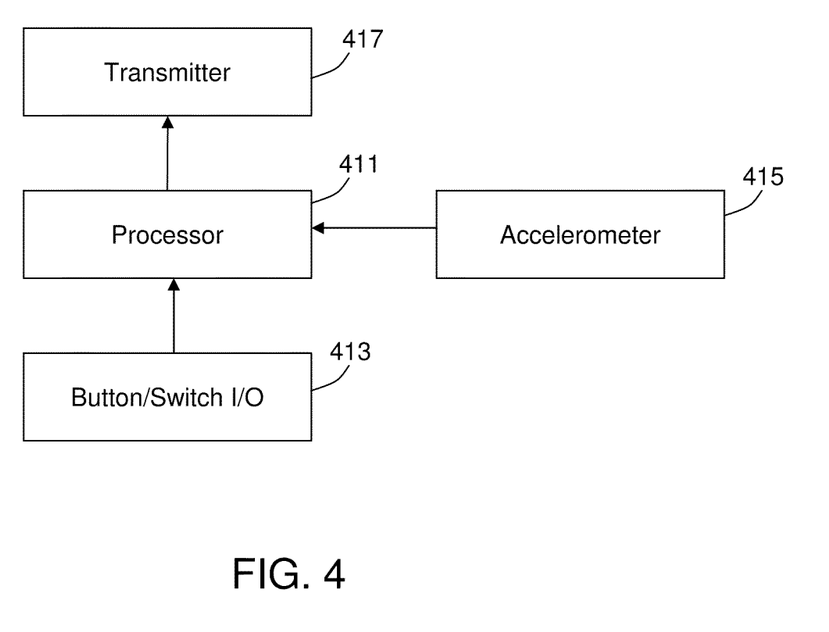
FIG. 4 is a block diagram of an example controller in accordance with aspects of the invention.

FIG. 4 is a block diagram of a controller in accordance with aspects of the invention. The controller generally provides controller signals, for example signals commonly provided by controllers to video game consoles, with the controller signals including for the controller of FIG. 4 position related signals. The controller includes a processor 411. The processor may be a digital signal processor in some embodiments, for example including analog input pins, or the processor may be any of a wide variety of programmable devices, with in some cases analog-to-digital converters also being provided to convert analog signals from other components to digital signals. As shown in FIG. 4, the processor receives signals from button/switch I/O 413, although in many embodiments only inputs may be provided, as shown in FIG. 4. The button/switch I/O may include a variety of input buttons, for example fret or strum related buttons of a guitar controller, and possibly may include analog inputs, for example as provided by a moveable bar coupled to a potentiometer, depending on configuration of the controller. As illustrated, the controller includes an accelerometer 415, which is preferably a three axis accelerometer, which provides signals to the processor. Although an accelerometer is shown in FIG. 4, in various embodiments additional accelerometers and/or other motion or position sensitive devices, for example a geomagnetic sensor, may instead or in addition be used. In addition, the controller is coupled to a transmitter, which may be a wireless transmitter. The transmitter generally transmits signals to the video game console, which receives the signals as input signals. In some embodiments, however, the transmitter may be a transceiver, or the controller may otherwise include receiver circuitry, with the controller also receiving signals from, for example, the video game console. The signals may be, for example, electromagnetic or optical signals, including infrared signals.

Figure 5:
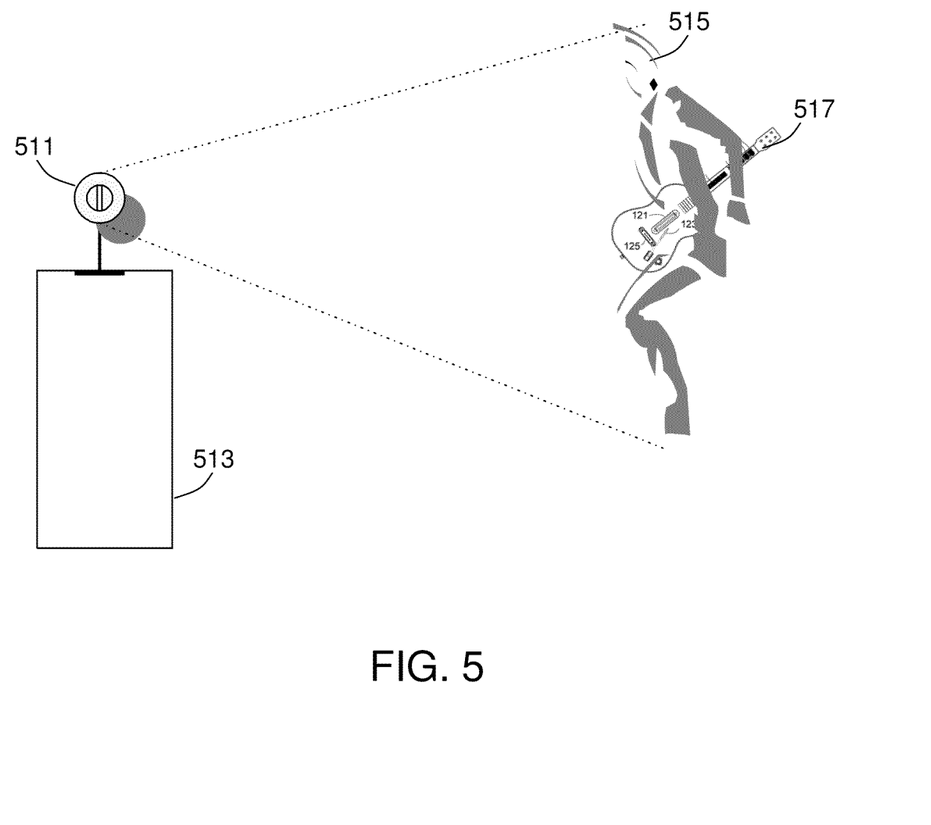
FIG. 5 illustrates an example motion determination system using a camera in accordance with aspects of the invention.

FIG. 5 shows a further configuration for providing a video game console with motion related signals. The configuration of FIG. 5 includes a video game console 513. An imaging device is coupled to the video game console. In various embodiments the imaging device is a visible light imaging device, for example a web camera, or an infrared imaging device or a thermal imaging device. A game player 515 is within the field of view of the imaging, device, and the game player is holding a controller 517. The controller, as illustrated, is in the shape of a guitar, although in various embodiments other controllers may be used.

In the embodiment of FIG. 5 the video game console includes image analysis program instructions, which may be provided by way of program instructions on a removable media such a CD-ROM on which program instructions for a video game are provided. The image analysis program may determine position of the controller or the game player. In some embodiments the controller or the game player may be provided light, thermal, or infrared emitting devices, reflective items, or other devices to increase ease of processing of the image analysis program.

Figure 6:
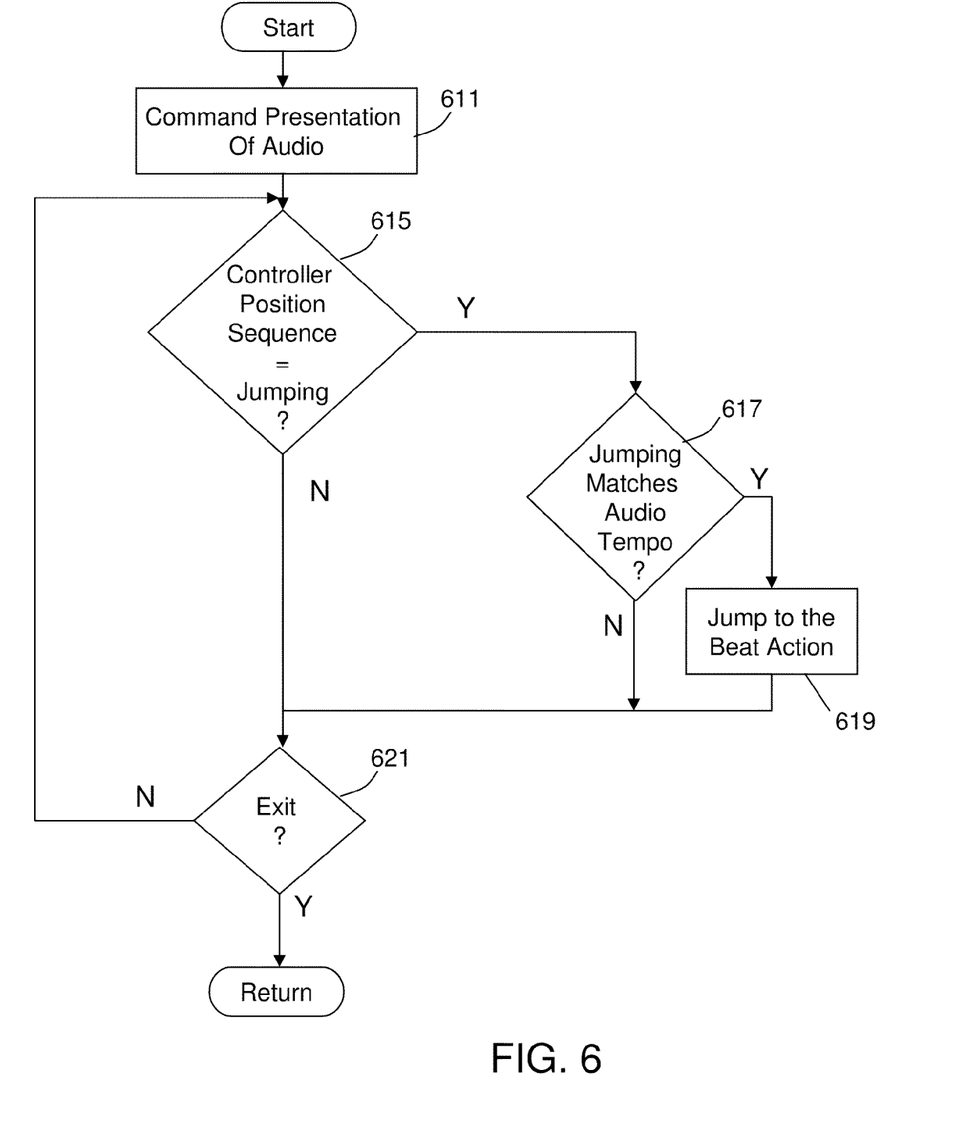
FIG. 6 is a flow diagram of a process for evaluating physical performance of a game player in a music-based video game in accordance with aspects of the invention.

FIG. 6 is a flow diagram of a further process in accordance with aspects of the invention. The process of FIG. 6 may be performed, for example, by the video game console of FIG. 1 or the processor of FIG. 3. In general, the process of FIG. 6 may be used to provide a jump to the beat feature or other feature based on rhythmic movement for a music-based video game.

In block 611 the process commands presentation of audio. The audio may be for a song used in a music-based video game. In block 615 the process determines if a sequence of controller positions is indicative of movement of the controller or game player holding the controller, for example a jumping or similar motion of a game player holding the controller. For example, the process may be performed by a video game console receiving position related signals from a controller, and the position related signals may indicate the controller is repetitively moving up and down by at least a predetermined distance.

If the process determines a sequence of controller positions is indicative of, for example, jumping by the game player the process proceeds to block 617, otherwise the process goes to block 621. In block 617 the process determines if the jumping matches a tempo of the song, although in some embodiments the process may more particularly determine if the jumping matches timing of tempo or beat or rhythmic accents of the song. In some embodiments a visual indicator or tactile indicator, for example a tactile indicator provided by a vibration or rumble component of the game controller, can provide tempo information. If so, the process proceeds to block 619 and performs an action defined for or based on a determination of jumping to the tempo, or alternatively an action defined for a status of the music-based video game. The action may, for example, be an increase in a point score or application of a multiplier for compliance with user instructive cues while jumping or moving the controller in relation to the tempo or beat.

Alternatively, in a combination of blocks 617 and 619, the process may instead or in addition determine a measure of a height of a jump or simulated jump, for example a jump-like movement in which a game player's feet do not leave the ground. For example, a height of a jump may be estimated based on relative movement in controller position, or magnitude of force acting on the controller as a game player holding the controller lands. In such embodiments the process may award a game player increased points for increased estimated height of a jump.

The process thereafter proceeds to block 621 and determines if the process should exit. If not, the process goes to block 615, otherwise the process returns.

Figure 7:
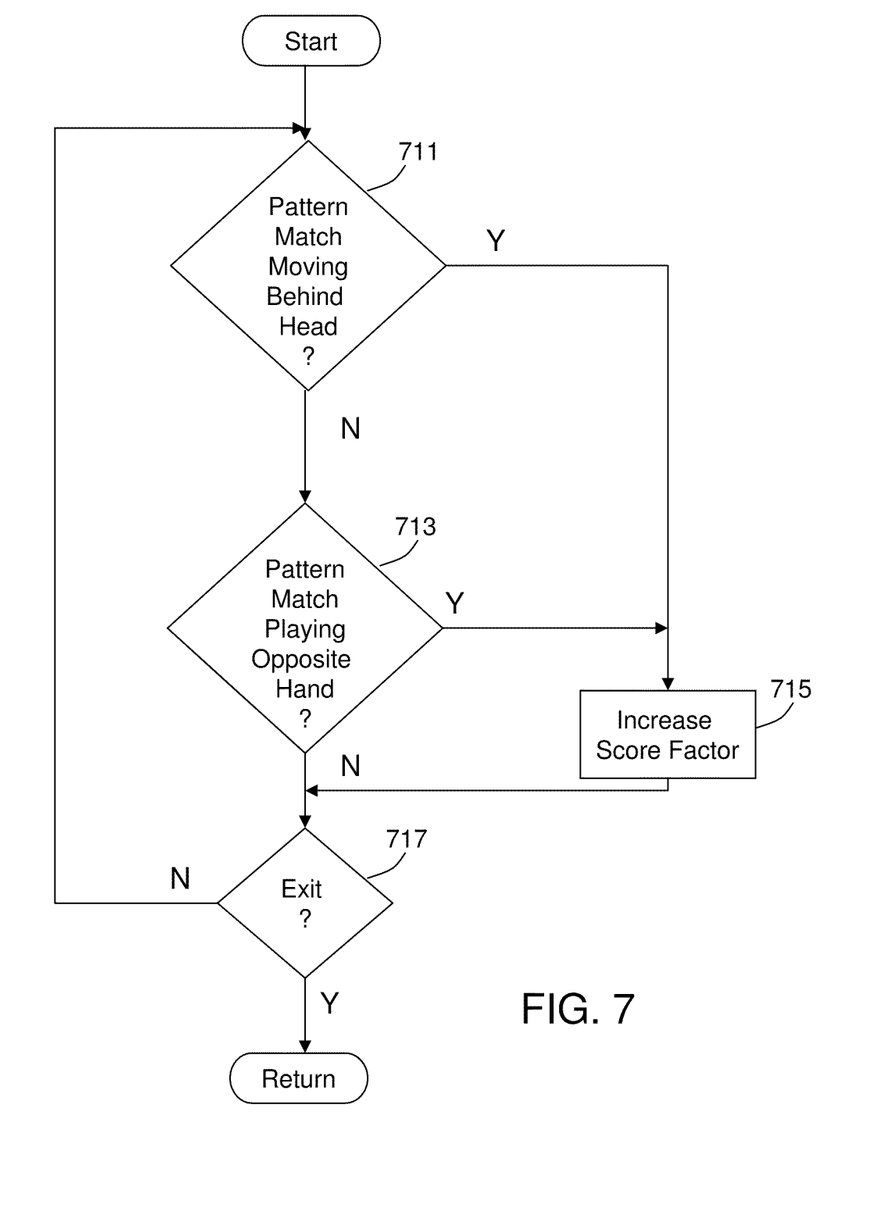
FIG. 7 is a flow diagram of another process for evaluating physical performance of a game player in a music-based video game in accordance with aspects of the invention.

FIG. 7 is a flow diagram of a further process in accordance with aspects of the invention. The process of FIG. 7 may be performed, for example, by the video game console of FIG. 1 or the processor of FIG. 3. In general, the process of FIG. 7 may be used to determine if a game player is operating a game controller in a particular position while playing, for example, a music-based video game.

In block 711 the process determines if a sequence of controller positions is indicative of a game player holding the controller behind the head of the game player. For example, the process may be performed by a video game console receiving position related signals from a controller, and the position related signals may indicate the controller has been moved upward and rearward by at least a predetermined distance. If the process determines the sequence of controller positions is indicative of the game player holding the controller behind his or her head, the process proceeds to block 715, otherwise the process proceeds to block 713.

In block 713 the process determines if a sequence of controller positions is indicative of a game player playing the controller with the opposite hand. For example, the process may be performed by a video game console receiving position related signals from a controller, and the position related signals may indicate the controller has been rotated about two axes within a predetermined range of rotations. If the process determines the sequence of controller positions is indicative of the game player playing the controller with the opposite hand, the process proceeds to block 715, otherwise the process proceeds to block 717.

In block 715 the process increases a score factor, such as a score multiplier, for compliance with user instructive cues. The process thereafter proceeds to block 717 and determines if the process should exit. If not, the process goes to block 711, otherwise the process returns.

Figure 8:
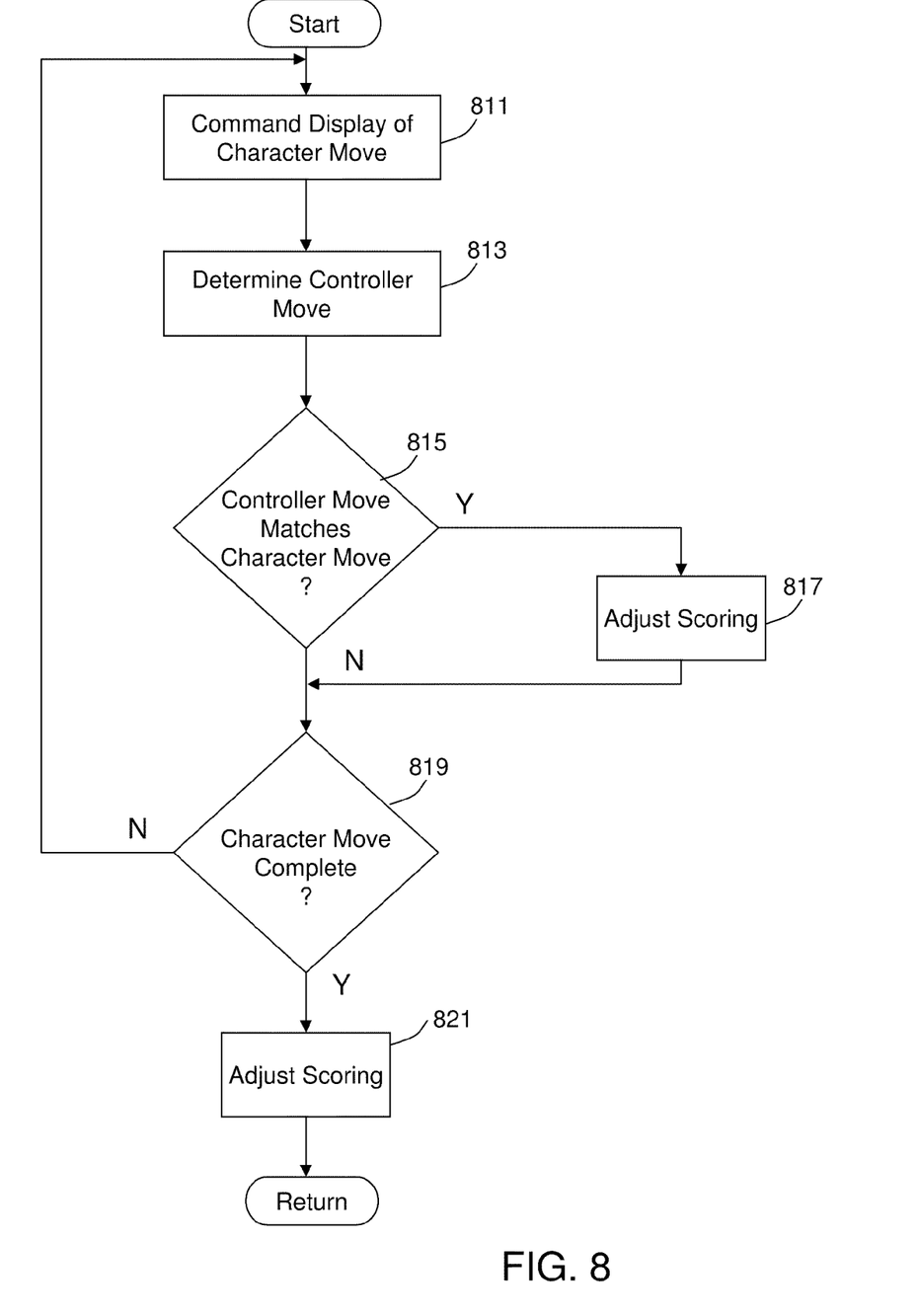
FIG. 8 is a flow diagram of yet another process for evaluating physical performance of a game player in a music-based video game in accordance with aspects of the invention.

FIG. 8 is a flow diagram of a further process in accordance with aspects of the invention. The process of FIG. 8 may be performed, for example, by the video game console of FIG. 1 or the processor of FIG. 3. In general, the process of FIG. 8 may be used to provide a video game feature in the context of a music-based video game in which a game player mimics motions of a character in the video game, for example in which a game player mimics a signature or other move of a well-known or popular musician represented by the character in the video game.

In block 811 the process commands display of movement of a video game character. In many embodiments the video game character is a character in a music-based video game, and the video game character may be shown as playing an instrument, for example. In some embodiments the movement of the video game character may be movements of the video game character that primarily result in movement of the instrument which the video game character is playing. In other embodiments movement of the video game character may be movements of the video game character that primarily result in movement of the video game character, but which may have an ancillary effect of movement of the instrument which the video game character is playing. In some embodiments the video game character is selected from a plurality of video game characters, for example by a game player operating a controller prior to the commencement of game play. In such embodiments, or other embodiments including a plurality of possible video game characters, different video game characters may have different repertoires of movements.

In block 813 the process determines movements of a controller. Movements of the controller, for example, may be determined by processing input signals indicative of position or movement (which may be signals regarding force or acceleration) of the controller, for example input signals based on outputs of an accelerometer of the controller. In block 815 the process determines if movement of the controller matches a predefined movement. The predefined movement generally corresponds to movement of the video game character. If the process determines that movement of the controller matches the predefined movement, the process proceeds to block 817 and adjusts the score for the game player, with the score for the game player being increased in most embodiments. Otherwise, or after performing the operations of block 817, the process proceeds to block 819.

In block 819 the process determines if the game character movement is complete. For example, the game character movement may include spinning and thereafter raising a guitar, etc., and game character movement may occur over a period of time. If game character movement is not complete the process goes to block 811 and command display of further game character movement. Otherwise the process goes to optional block 821 and further adjusts the game player score, for example providing bonus points depending on the extent to which the game player matched multiple portions of game character movement. In addition, an amount of bonus points provided may also be adjusted based on a selected player difficulty level or fitness level. The process thereafter returns.

Figure 9:
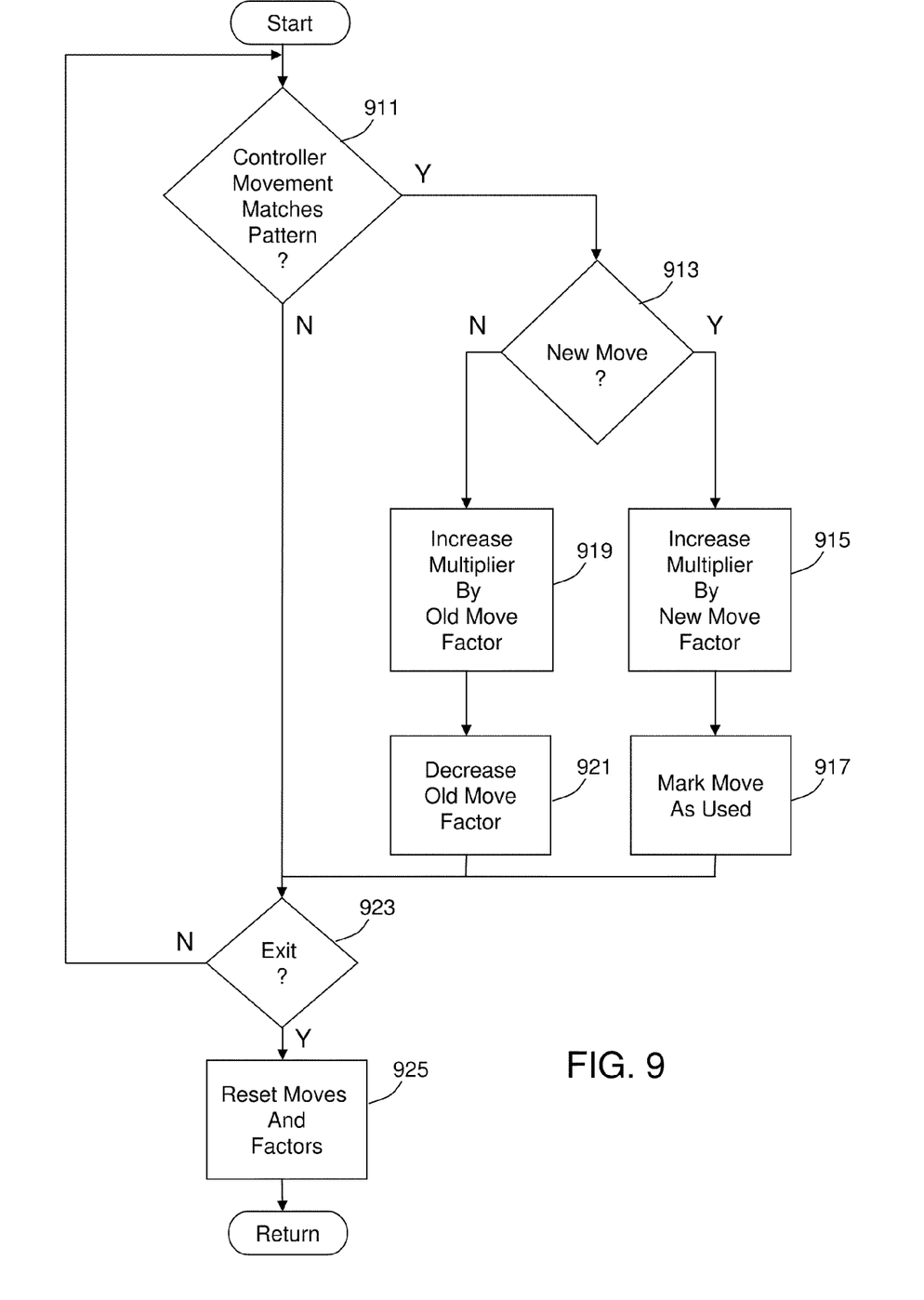
FIG. 9 is a flow diagram of still yet another process for evaluating physical performance of a game player in a music-based video game in accordance with aspects of the invention.

FIG. 9 is a flow diagram of a further process in accordance with aspects of the invention. The process of FIG. 9 may be performed, for example, by the video game console of FIG. 1 or the processor of FIG. 3. In general, the process of FIG. 9 may be used to adjust game player scoring in a music-based video game based on movement by a game player.

In block 911 the process determines if movement of a controller matches a predefined pattern. In most embodiments the predefined pattern is any of a plurality of predefined patterns. If so, the process proceeds to block 913 and determines if movement of the controller represents a new move or a move previously accomplished. For example, as discussed below with respect to block 917, the process may maintain a record of which predefined patterns have already been matched by controller movement. If the movement of the controller represents a new move the process proceeds to block 915 and increases a score multiplier for the game player by a new move factor and marks the move as used in block 917. If the movement of the controller represents an old move the process proceeds to block 919 and increases the score multiplier for the game player by an old move factor and decreases the old move factor in block 921. In most embodiments the new move factor is greater than the old move factor, thereby rewarding different movements by the game player, who is presumably holding the game controller.

After performing the operations of blocks 917 or 921, or if the process determined that movement of the controller did not match a predefined pattern in block 911, the process determines whether to exit in block 923. If yes, the process marks all moves as unused and resets the old move factor in block 925 and thereafter returns, otherwise the process goes back to block 911.

Figure 10:
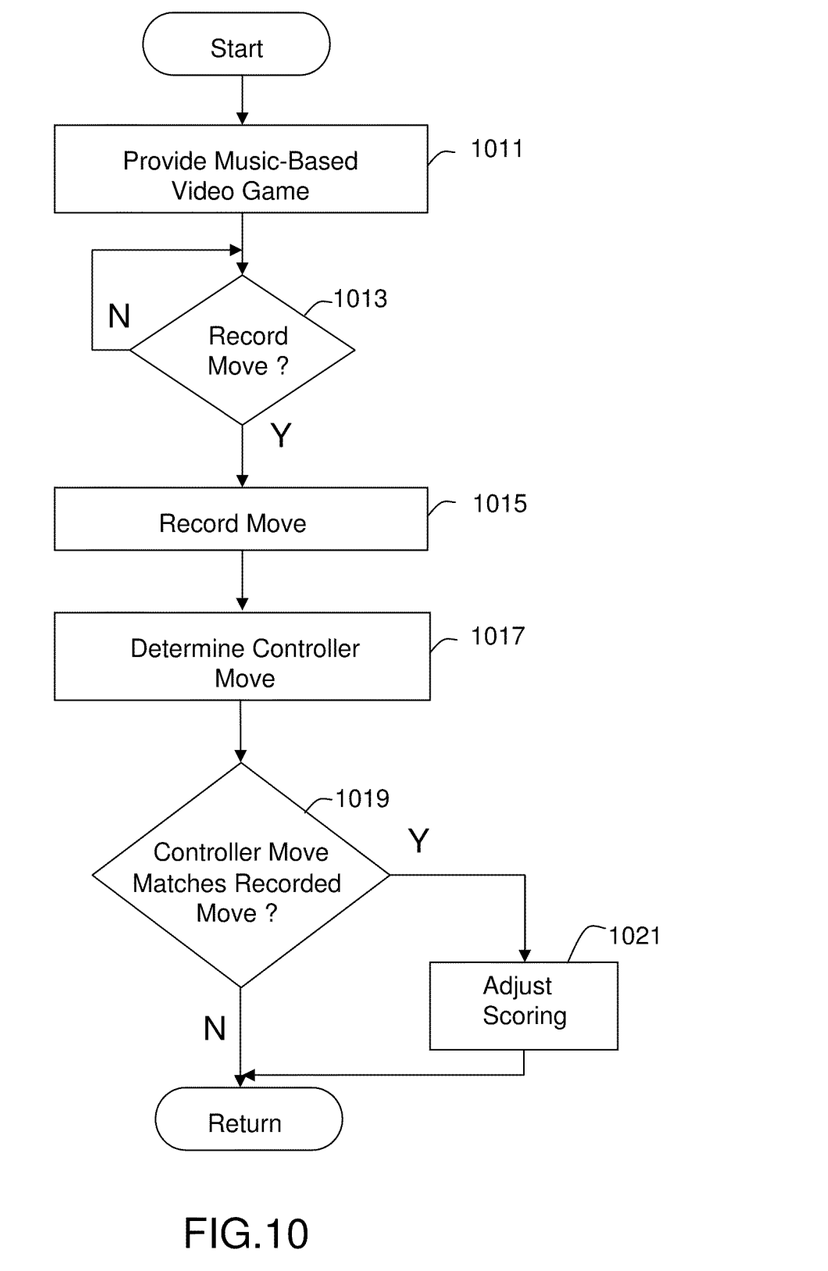
FIG. 10 is a flow chart of a process of video game operations in accordance with aspects of the invention.

FIG. 10 is a flow chart of video game operations in accordance with aspects of the invention. The process may be performed by the video game console of FIG. 1, or a processor of the video game console, for example as discussed below with respect to FIG. 3.

In block 1011 the process provides for music-based video game play. In many embodiments the process commands display of instructive cues and evaluates game player compliance with the instructive cues, for example based on input signals or movements provided by a controller operated by the game player, and in most embodiments throughout operation of the process. In many embodiments the process also commands presentation of audio of a song or portions of a song or other musical sounds or sound effects, with extent of presentation of the song dependent on extent of compliance by the game player with instructive cues. The process may also provide features of music-based video game play commonly found in music-based video games.

Blocks 1013-1021 relate to motion-related processing during music-based video game play. The motion related-processing is for movements of a game player or a controller carried by the game player. The movements may be responsive to a prompt provided during music-based video game play, for example a motion of or expression by a game character, or other visual, auditory, tactile or other prompt. Alternatively, the movements may be independent of a prompt provided during game play.

In block 1013 the process determines if movements of a controller should be recorded. In some embodiments the process determines that movements of the controller should be recorded by determining that a predefined time has been reached in game play or a predefined event has occurred in game play. For example, in some embodiments movements of the controller should be recorded during specific portions of a song provided as part of game play. Also for example, in some embodiments movements of the controller should be recorded if a game player has achieved a predefined score level, or has complied with certain instructive cues. In some embodiments, for example multiplayer embodiments, movements of a first game controller should be recorded if a game player operating another game controller performs a predefined action or meets some other criteria during game play. If the process determines that it is to record movements of a controller, the process proceeds to block 1015, otherwise the process goes back to block 1013.

In block 1015 the process records movements of a controller. The controller movements may be utilized as a proxy for game player movement in some embodiments, and in some embodiments the process may instead determine game player movement. For purposes of simplicity of exposition, however, reference shall be primarily to controller movement. In some embodiments the process records controller movement by processing input signals generated by a position and/or acceleration dependent sensor in or on the controller. The process stores an indication of controller movement.

In block 1017 the process determines movements of a controller. The controller may be the same controller for which movements were recorded or, in some embodiments, movements of another controller, for example a controller operated by another player. Movements of the controller, for example, may be determined by processing input signals indicative of movement (which may be signals regarding force or acceleration) of the controller, for example input signals based on outputs of an accelerometer in or on the controller.

In block 1019 the process determines if the controller movement in block 1017 matches the controller movement recorded in block 1015. If the process determines that the movement of the controller in block 1017 matches the movement recorded in block 1015, the process proceeds to block 1021, otherwise the process returns.

In block 1021, the process adjusts the score for the game player. The process thereafter returns.

Figure 11:
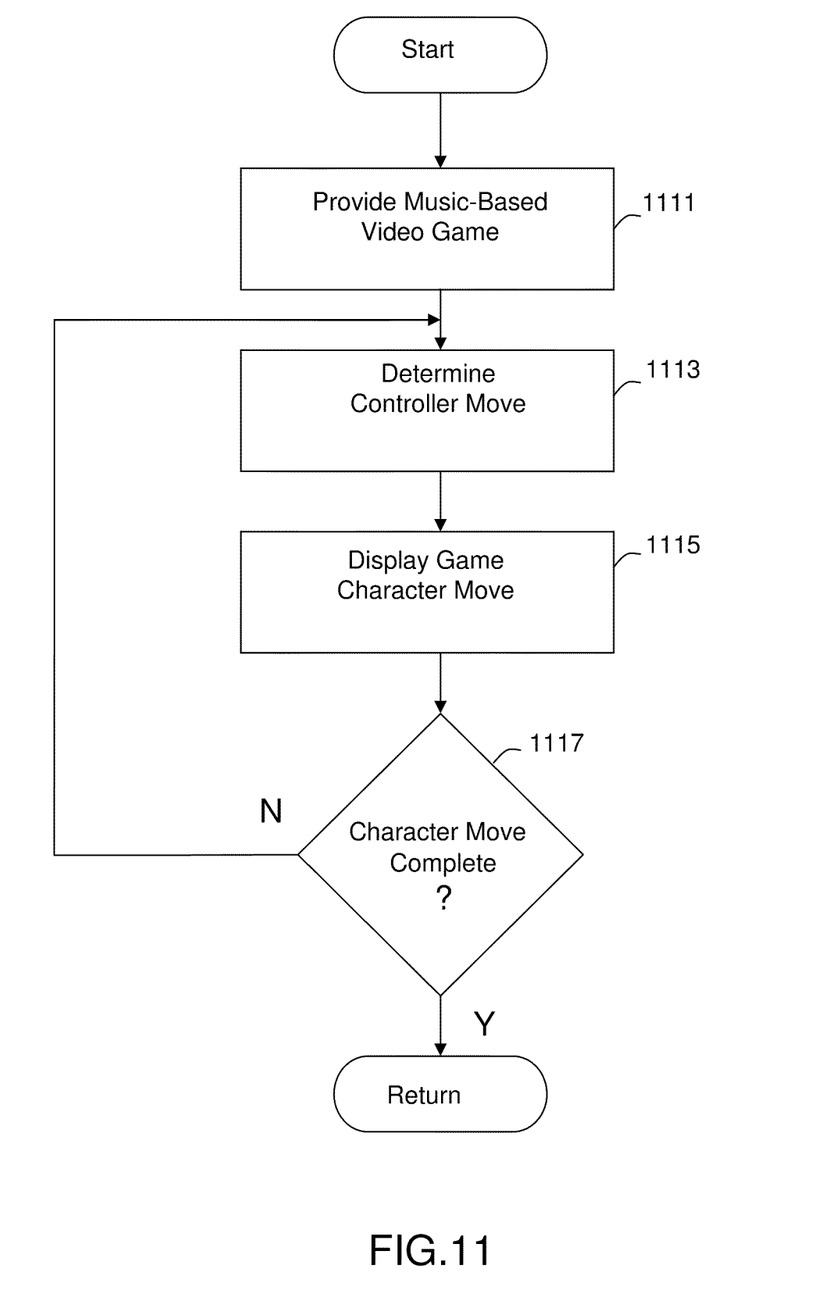
FIG. 11 is a flow chart of a further process of video game operations in accordance with aspects of the invention.

FIG. 11 is a flow chart of video game operations in accordance with aspects of the invention. The process may be performed by the video game console of FIG. 1, or a processor of the video game console, for example as discussed below with respect to FIG. 3. In general, the process of FIG. 11 may be used to provide a video game feature in the context of a music-based video game in which movement of a character in the video game generally corresponds to movement of a game player, which in some embodiments may be deduced by movement of a game controller.

In block 1111 the process provides for music-based video game play. In many embodiments the process commands display of instructive cues and evaluates game player compliance with the instructive cues, for example based on input signals or movements provided by a controller operated by the game player. In many embodiments the process also commands presentation of audio of a song or portions of a song, with extent of presentation of the song dependent on extent of compliance by the game player with instructive cues. The process may also provide features of music-based video game play commonly found in music-based video games.

Blocks 1113-1117 relate to a motion-related processing during music-based video game play. The motion related-processing is for movements of a game player or a controller carried by the game player. The movements may be responsive to a prompt provided during music-based video game play, for example a motion of or expression by a game character, or other visual, auditory, tactile or other prompt. Alternatively, in some embodiments the movements may be independent of a prompt provided during game play.

In block 1113 the process determines movements of a controller. In some embodiments, the controller movement may be utilized as a proxy for game player movement. For simplicity of exposition, however, reference shall be primarily to controller movement. Movements of the controller, for example, may be determined by processing input signals indicative of movement (which may be signals regarding force or acceleration) of the controller, for example input signals based on outputs of an accelerometer in or on the controller. In some embodiments, the process may match movements to predefined patterns or a sequence of predefined patterns. For example, predefined patterns may include the game player using the controller behind the game player's head, spinning the controller, throwing and catching the controller, and reversing positions of the controller such that the game player operates controls of the controller with opposite hands. The process may determine a sequence of predefined patterns, for example the game player spinning the controller, using the controller with the game player's opposite hand, throwing and catching the controller, and then using the controller behind the game player's head.

In block 1115 the process commands display of movement of a game character. In many embodiments the game character is a character in a music-based video game, and the game character may be shown as playing an instrument, for example. In some embodiments the game character movements, and/or movements of the instrument held by the game character, corresponds to movement of the game player and/or controller held by the game player. In some embodiments the movement of the game character may be a predefined pattern or a sequence of predefined patterns. For example, predefined patterns may include the game character playing the instrument behind the game character's head, spinning the instrument, throwing and catching the instrument, and playing the instrument with the game character's opposite hand. The game character may be shown performing a sequence of predefined patterns, for example spinning the instrument, playing the instrument with the game character's opposite hand, throwing and catching the instrument, and then playing the instrument behind the game character's head. In some embodiments the movement of the game character generally corresponds to the movements of the controller in block 1113. For example, if the game player uses the controller behind the game player's head and then uses the controller with the opposite hand, the game character may be displayed as playing an instrument behind the game character's head and then playing the instrument with the game character's opposite hand.

In block 1117 the process determines if the movement of the controller is complete. In some embodiments, the process may determine that the movement of the controller is complete after a predefined period of time has elapsed. For example, the process may determine that movement of a controller is complete after 10 seconds has elapsed since the beginning of controller movement or prompting of controller movement. In some embodiments, the process may determine that movement of the controller is complete after a period of time in which substantially no movement of the controller occurs. For example, the process may determine that movement of a controller is complete after the process has not detected any movement of the controller for 3 seconds. If the controller movement is not complete the process goes to block 1113 and determines further controller movement. Otherwise, the process returns.

Accordingly, the invention provides for a user physical performance aspect in a music-based video game. Although the invention has been discussed with respect to certain embodiments, it should be recognized that the invention comprises the novel and non-obvious claims and their insubstantial variations supported by this disclosure.

What is claimed is:

1. A method of evaluating game player movement in a music-based video game, comprising:

commanding presentation of instructive cues for operation of controllers, the instructive cues including instructive cues for operation of at user-manipulable input device on the controllers;

determining compliance with the instructive cues by a first game player operating a first controller by evaluating input signals indicative of user manipulation of user-manipulable input devices on the first controller and determining compliance with the instructive cues by a second game player operating a second controller by evaluating input signals indicative of user manipulation of user-manipulable input devices on the second controller;

recording information of additional input signals indicative of rotational or translational movement of the first controller by the first game player, the additional input signals being detected by one or more position sensing input devices coupled to the first controller;

determining if information indicative of rotational or translational movement of the second controller by the second game player matches the recorded information of the additional input signals indicative of the rotational or translational movement of the first controller by the first game player; and commanding presentation of feedback to at least the second game player based on extent of matching of the information indicative of rotational or translational movement of the second controller by the second game player and the recorded information of the additional input signals indicative of rotational or translational movement of the first controller by the first game player.

2. The method of claim 1 wherein the additional input signals indicative of rotational or translational movement of the first controller by the first game player include signals received by a position or acceleration sensing device coupled to the first controller operated by the first game player.

3. The method of claim 1 wherein the information indicative of rotational or translational movement of the second controller by the second game player includes input signals detected by one or more position sensing input devices onboard the second controller operated by the second game player.

4. The method of claim 1 wherein the feedback to at least the second game player comprises a score.

5. A system for use in providing for music-based video game play, the system comprising:

a processor configured by program instructions to:

command presentation of instructive cues for operation of input devices of a first controller and a second controller, the input devices including at least one user-manipulable input device;

determine extent of compliance by a first game player and a second game player with the instructive cues based on signals from the first controller and the second controller;

command presentation of feedback to the first and second game players as to extent of compliance with the instructive cues;

command storage of information indicative of rotational or translational movement of the first controller by the first game player;

compare information indicative of rotational or translational movement of the second controller by the second game player with the information indicative of rotational or translational movement of the first controller by the first game player; and command presentation of feedback to the second game player as to an extent of matching of the information indicative of rotational or translational movement of the second controller by the second game player with the information indicative of rotational or translational movement of the first controller by the first game player.

6. The system of claim 5 further comprising a display for displaying the instructive cues and the feedback to the first and second game players and the feedback to the second game player.

7. The system of claim 5 further comprising the first controller, the controller having the input devices, and the second controller.

8. The system of claim 7 wherein the first controller and the second controller each include at least one accelerometer, the information indicative of movement of the first controller by the first game player being based at least in part on output of the at least one accelerometer of the controller and the information indicative of movement of the second controller by the second game player being based on output of the at least one accelerometer of the second controller.

* * * * *